United States Patent
Peterson et al.

(12)

(10) Patent No.: US 8,649,140 B2
(45) Date of Patent: Feb. 11, 2014

(54) VOLTAGE ACTIVATED 2ND LEVEL SAFETY CIRCUIT FOR PERMANENT ISOLATION

(75) Inventors: Brian Robert Peterson, Norton, MA (US); Jon James Carroll, Attleboro, MA (US); Todd Sweetland, Middleboro, MA (US); Gregory George Decker, Taunton, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 260 days.

(21) Appl. No.: 13/396,068

(22) Filed: Feb. 14, 2012

(65) Prior Publication Data

US 2012/0224289 A1 Sep. 6, 2012

Related U.S. Application Data

(60) Provisional application No. 61/476,798, filed on Apr. 19, 2011, provisional application No. 61/449,223, filed on Mar. 4, 2011.

(51) Int. Cl.
*H02H 3/00* (2006.01)

(52) U.S. Cl.
USPC .............................................. 361/79; 361/78

(58) Field of Classification Search
USPC .................................................... 361/78, 79
See application file for complete search history.

(56) References Cited

U.S. PATENT DOCUMENTS

| 6,548,206 | B1 | 4/2003 | Gauthier |
| 7,112,059 | B2 * | 9/2006 | Donnelly ...................... 431/22 |
| 7,667,435 | B2 | 2/2010 | Denning |
| 2009/0179618 | A1 | 7/2009 | LiTingTun |
| 2010/0165529 | A1 | 7/2010 | Turpin |
| 2011/0014501 | A1 | 1/2011 | Scheucher |

FOREIGN PATENT DOCUMENTS

| EP | 2110920 A1 | 10/2009 |
| EP | 2079142 B1 | 9/2010 |

* cited by examiner

*Primary Examiner* — Rexford Barnie
*Assistant Examiner* — Tien Mai
(74) *Attorney, Agent, or Firm* — Roach Brown McCarthy & Gruber, P.C.; Kevin D McCarthy

(57) ABSTRACT

A voltage activated $2^{nd}$ level safety circuit for permanent isolation having a current activated fuse useful for class III medical devices, military applications, and any other passive loads. The battery system has a fuse current limiter and the current activated fuse maintain the fuse closed when a power cell, having a current sufficient to blow the fuse expeditiously, directs its current to the load. The power cell continues to direct its current to the load until the system detects an unacceptable battery or circuit condition. Once that unacceptable condition exists and is detected, a fuse blowing circuitry allows the power cell's current to expeditiously blow the current activated fuse. In response to the blown current activated fuse, the system's isolation switch(es) open as well to establish a permanent isolated battery.

37 Claims, 10 Drawing Sheets

VOLTAGE ACTIVATED 2ND LEVEL SAFETY CIRCUIT FOR PERMANENT ISOLATION

REFERENCE TO CO-PENDING APPLICATION

Priority is claimed to (a) U.S. Provisional application Ser. No. 61/449,223, filed on Mar. 4, 2011; and (b) U.S. Provisional application Ser. No. 61/476,798, filed on Apr. 19, 2011.

FIELD OF THE INVENTION

The present invention relates to battery packs, preferably rechargeable battery packs, and how to obtain permanent battery isolation when a certain condition exists.

BACKGROUND OF THE INVENTION

A variety of electronic devices utilize a rechargeable battery. Examples of (a) the rechargeable battery include a lithium ion type, a nickel-cadmium type, and a nickel-metal hydride type; and (b) the electronic devices include laptop computers, cell phones, personal digital assistants, power tools, etc. Some rechargeable batteries may become hazardous under certain conditions including and not limited to over voltage conditions, over current conditions, thermally unacceptable conditions, some other unacceptable battery or electrical circuit condition, or combinations thereof. Hence, a variety of battery protection circuits have been utilized in battery packs of such rechargeable batteries.

FIG. 1a is a schematic diagram of a prior art battery protection circuit used in association with a rechargeable battery pack 1. The rechargeable battery pack 1 has a power cell 3, such as one or more lithium ion cells, that normally provides power to a load 2. The load 2 and the cell 3 are electrically connected through an upper supply rail, +Ve, and a lower power supply rail, −Ve.

Use of the term "battery" pack is not intended to indicate that more than one power cell 3 is necessarily employed, although in various embodiments, more than one power cell 3 may be employed.

The load 2 can be a passive load such as a cell phone or a PDA, or an active element such as a battery charger, which can recharge the rechargeable battery pack 1. As seen in FIG. 1a, the rechargeable battery pack 1 includes the power cell 3, a thermal protector 4 and a protection circuit module (PCM) 5 driving the load 2. An arrow 16 shows the direction of positive current flow in a loop that includes the power cell 3, the load 2, the PCM's electronic switching devices 7 and 8, and the thermal protector 4. When the load 2 is supplanted by a charger, the direction of positive current flow 16 in the loop is reversed.

The PCM 5 includes an integrated circuit control chip 6 operatively coupled to one or more electronic switching devices 7 and 8. The electronic switching devices 7 and 8 may be any variety of transistors including field effect transistors (FETs). The FETs can be, for example, a metal oxide semiconductor field effect transistors (MOSFETs), as illustrated in FIGS. 1a and b, or bipolar junction transistors. The PCM 5 is essentially a switch that (a) detects abnormal current or voltage and (b) disconnects, shortly after the switch detects the abnormal current or voltage, the cell 3 from the load 2, or, alternatively, a charger if the rechargeable battery pack 1 is being charged.

The thermal protector 4 provides protection for the rechargeable battery pack 1 from thermally unacceptable conditions. Thermally unacceptable conditions can damage or impair electronic components such as those in the load 2.

The thermal protector 4 may be, for example, a thermal fuse, a thermal breaker or a positive temperature coefficient (PTC) thermistor. Thermal protector 4 may also be either non-resettable or resettable. Non-resettable thermal protectors have lower equivalent series resistance (ESR), but once tripped, a rechargeable battery pack employing the non-resettable thermal protector is essentially no longer of any use. Resettable thermal protectors have higher ESRs, but can be tripped and reset many times.

ESR is a parameter that determines the usable energy stored in the cell 3, and thus the usable energy stored in the rechargeable battery pack 1. Generically, lower ESR means longer operation such as longer talk times for a cell phone. In the rechargeable battery pack 1, the ESR thereof includes the internal resistance of the cell 3, the resistance of the thermal protector 4, the resistance of the electronic switching devices 7 and 8 (as illustrated), and the resistance of any connectors and other conductors in the circuit path 16 (a) to the load 2 and (b) from the load 2. Since the thermal protector 4 is in the circuit path 16 coupling the cell 3 to the load 2 and the resistance of the thermal protector 4 is not negligible, the thermal protector 4 adds to the ESR of the rechargeable battery pack 1.

The circuit control chip 6 is not in the circuit path 16 of upper and lower power supply rails, +Ve and −Ve, that includes the cell 3, the thermal protector 4 and the load 2. Instead the circuit control chip 6 is on a negligible power supply rail, denoted as Vn, and as a result the circuit control chip 6 does not significantly contribute to the ESR.

FIG. 1b illustrates an alternative embodiment wherein the thermal protector 4, illustrated as a positive temperature coefficient thermistor, and the circuit control chip 6 are both on the negligible power supply rail, Vn, and as a result the circuit control chip 6 and the thermal protector 4 do not significantly contribute to the ESR.

Under normal operation for the electrical circuitry illustrated at FIGS. 1a and b, the electronic switching devices 7 and 8 are "closed," that is, in a conducting condition in which each device 7 and 8 can conduct current along path 16.

The over voltage/over current detecting PCM 5, for FIGS. 1a and b, and the thermal protection circuitry 4, just for FIG. 1b, are operatively coupled to the electronic switching devices 7 and 8 such that the over voltage/over current detecting PCM 5 and the thermal protection circuitry 4 can each independently cause the electronic switching devices 7 and 8 to assume an "open" or non-conducting condition, in which the electronic switching devices 7 and 8 will not conduct current. When one of the electronic switching devices 7 and 8 is open, the loop 16 that includes the power cell 3, the load 2 and the electronic switching devices 7 and 8 is effectively made open, thereby preventing (a) the power cell 3 from supplying current to the load 2 or (b) the load 2 from recharging the power cell 3.

The two above-identified rechargeable battery pack circuits that protect the rechargeable battery pack from thermal runaway, over voltage or over current conditions are disclosed and illustrated in LiTingTun's U.S. published patent application number 2009/0179618, which was published on Jul. 16, 2009. LiTingTun's circuitry fails to provide a second layer of protection. In many applications, there is a requirement for a second layer of protection to be in place in the event the main circuit fails to isolate the rechargeable battery pack.

It is understood that when the second layer of circuit protection activates, the results are typically deemed permanent. An example of a second layer of circuit protection is set forth by Denning in U.S. Pat. No. 7,667,435, which issued on Feb. 23, 2010. In that patent, Denning disclosed a block diagram, illustrated at FIG. 2, of an electronic device 100 having a DC power source 104 and a battery pack 1 to supply power to the passive load 2. If the DC source 104 (e.g., an AC/DC adapter) is not present, power may be supplied to the system from the battery pack 1. If the DC source 104 is present, it may supply power to the load 2 and provide power to recharge the cells 3 of the battery. In a battery charging mode, first switch 7 may be closed and second switch 8 may be open in one instance. In that instance, current may then flow through closed first switch 7 and a second diode 8a in parallel with open second switch 8 to provide charging current to the cells 3. In another battery charging mode, both first and second switches 7 and 8 may be closed to reduce losses due to the second diode 8b. In a battery supply mode, first switch 7 may be open and second switch 8 may be closed in one instance. Current from the battery cells 3 to the load 2 may then flow through closed second switch 8 and first diode 7a in parallel with open first switch 7. In another battery supply mode, both first and second switches 7 and 8 may be closed to reduce losses due to the first diode 7a.

The battery pack 3 may also include a primary battery protection circuit 54 (which may include an equivalent of the over voltage/over current detecting PCM 5 and/or an equivalent of the thermal protection circuitry 4—previously described with respect to FIGS. 1a and 1b), a filter 31, a secondary safety circuit 32, and a fuse element 33. The primary battery protection circuit 54 may monitor a number of conditions including the voltage level of each cell 3 as well as charging and discharging current levels and provide charge (CHG) and discharge control signals (DSG). The voltage level of each cell 3 may also be monitored by the secondary battery protection circuit 32 via the filter 31. The filter 31 serves to filter out short duration over voltage transient spikes. The secondary battery protection circuit 32 monitors the voltage level of each cell 3 and provides a signal to the fuse element 33 to blow or open the fuse element if a voltage level of one cell 3 is greater than an over voltage threshold level for a sustained time interval. The filter 31 therefore serves to stop the fuse element 33 from blowing due to short duration over voltage transient spikes. The secondary battery protection circuit 32 is designed to provide an output to a fuse element to permanently disable the fuse element in response to a sustained over voltage condition. Denning's fuse is a voltage activated fuse since it responds to overvoltage spikes.

As described above, current circuit designs typically use voltage activated fuses and/or positive temperature coefficient thermistors (also called resettable fuses or polymeric positive temperature coefficient devices). Voltage activated fuses have a distinct advantage of passing a lot of current and requiring a low voltage signal, typically less than three (3) volts, to open the fuse and therefore isolate the battery pack from the output connectors. Such fuses tend to be small and fit into most electrical circuit systems.

There are disadvantages of using voltage activated fuses, however. One disadvantage is that few manufacturers make such a voltage activated fuse. Another disadvantage is the manufacturers of voltage activated fuses do not allow voltage activated fuses to be incorporated into products used in military applications or class III medical applications. Class III medical devices include and are not limited to pacemakers and defibrillators. One reason those voltage activated fuse manufacturers may impose such application restrictions is due to the fact that if the battery has a low capacity and that low capacity limits the amount of current it can source then the battery may fail to fully open the voltage activated fuse. Alternatively written, the voltage activated fuse may not open completely if the battery cannot supply enough power and thus leaves a closed fuse that was supposed to be open. Such fuse failure would be deleterious to a patient, military operation, or other application. In view of these known disadvantages, there is a need to design a voltage activated $2^{nd}$ level safety circuit for permanent isolation that uses a current activated fuse. Second level safety circuits are designed to protect against first level protection circuit component failure. For example, when a first level protection circuit component detects an over voltage condition, an over current condition, a thermally unacceptable condition or some other unacceptable battery or circuit condition and the electronic switching device(s), normally a field effect transistor, fails to open and/or is fused closed when that unacceptable condition is detected, then the second level safety circuit is activated and permanently opens the battery pack.

SUMMARY OF THE INVENTION

A voltage activated $2^{nd}$ level safety circuit for permanent isolation having a current activated fuse is used in association with class III medical devices, military applications, and any other passive loads that use a battery system, preferably a rechargeable battery system. The battery system strategically positions a fuse current limiter and the current activated fuse to allow the current activated fuse to remain closed when a power cell, having a current sufficient to blow the current activated fuse expeditiously, directs its current to the load. The power cell continues to direct its current to the load until the system detects an over current condition, an over voltage condition, a thermally unacceptable condition, some other unacceptable battery or circuit condition, or combinations thereof. Once that unacceptable condition exists and is detected, a fuse blowing circuitry allows the power cell's current to expeditiously blow the current activated fuse. In response to the blown current activated fuse, the system's isolation switch(es) open as well to establish a permanent isolated battery.

BRIEF DESCRIPTION OF THE DRAWINGS

A full understanding of the invention can be gained from the following Detailed Description when read in conjunction with the accompanying drawings, in which:

FIG. 1b is an alternative prior art schematic diagram of FIG. 1a;

DETAILED DESCRIPTION OF THE INVENTION

Figure 1A:
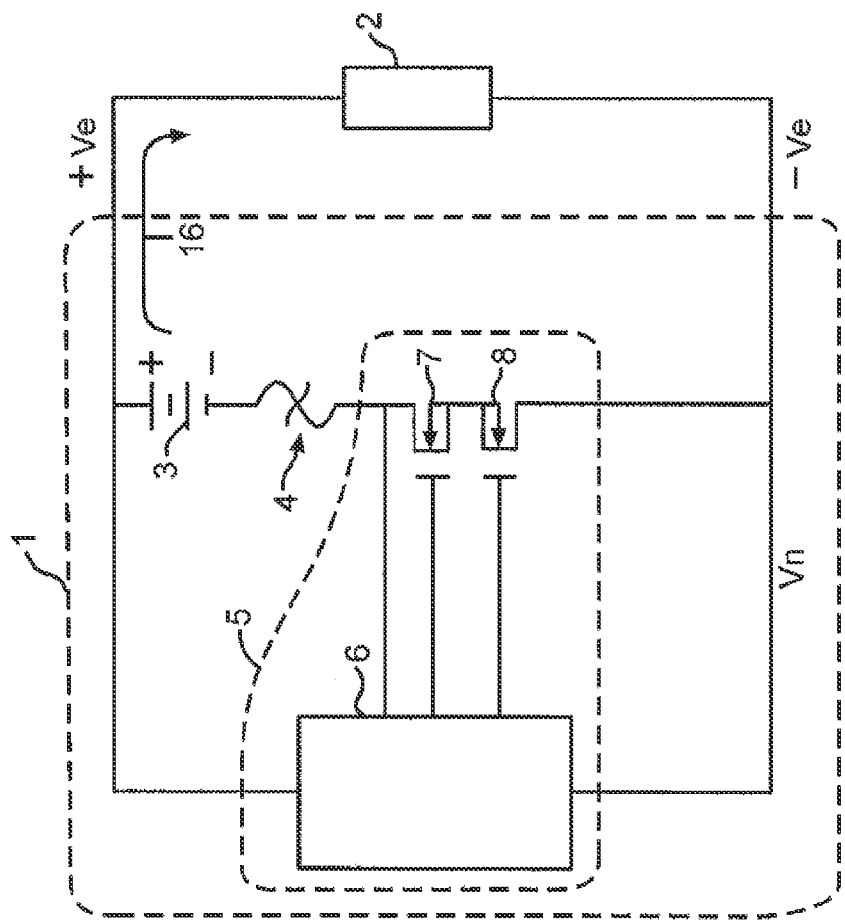
FIG. 1a is a schematic diagram of a prior art rechargeable battery pack, such as a Lithium-Ion battery pack, that may be used to provide power to a load, such as a cell phone or a PDA.
Figure 1B:
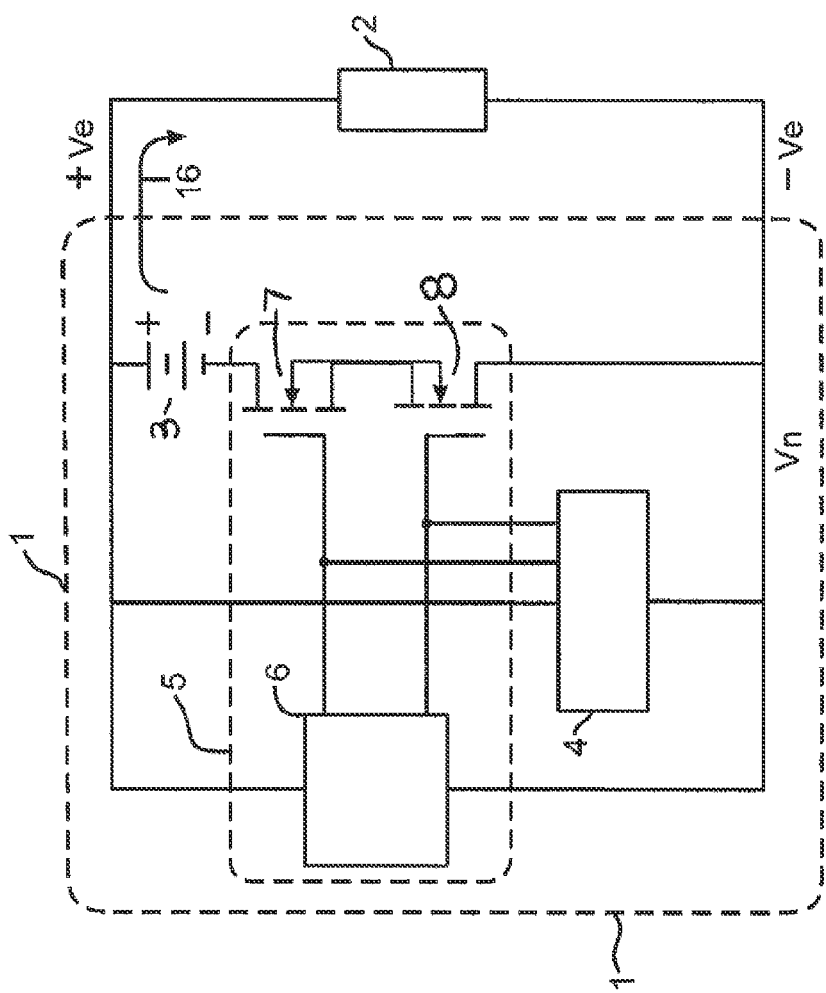
Figure 2:
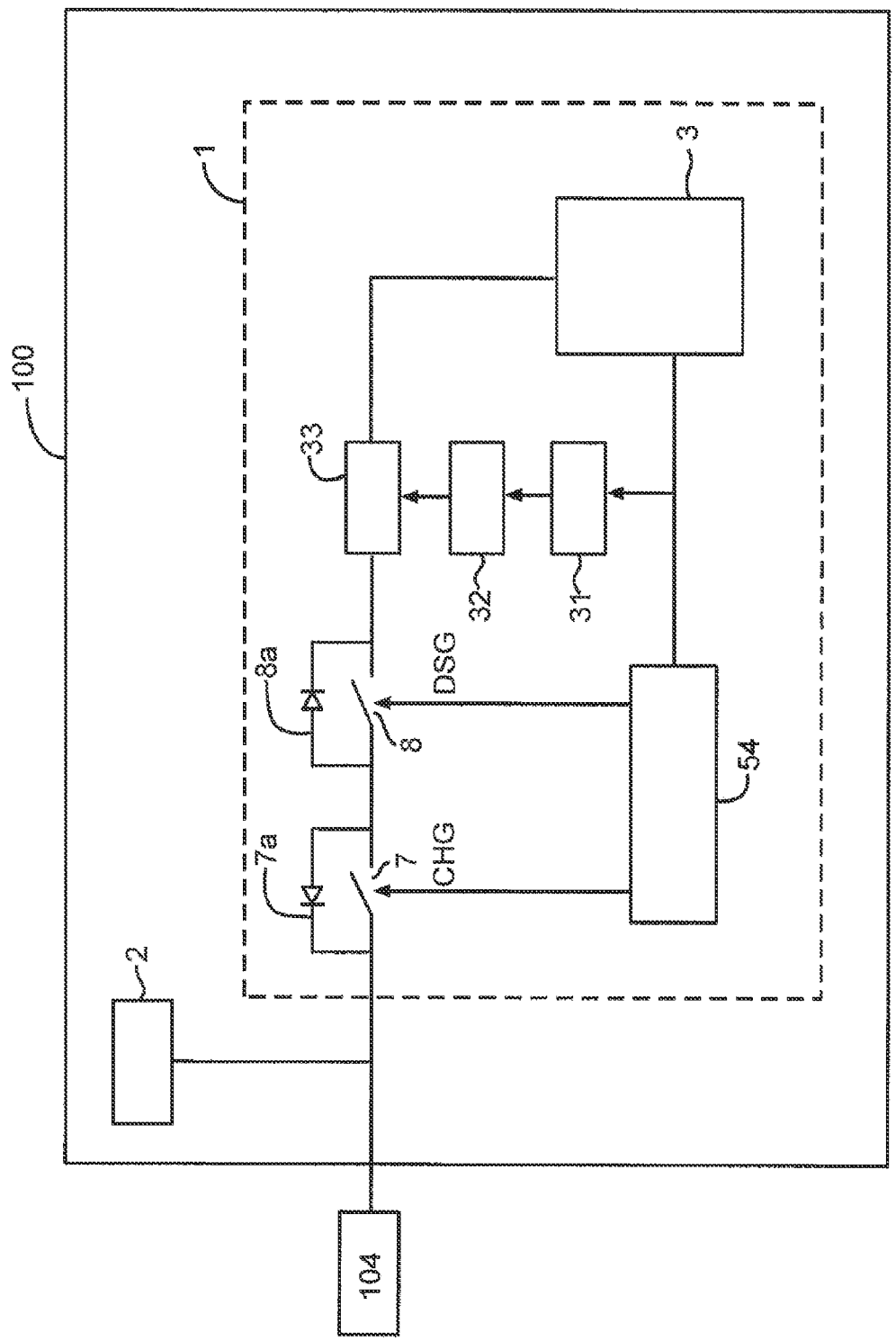
FIG. 2 illustrates prior art block diagram of an electronic device having a secondary safety protection circuit.
Figure 3:
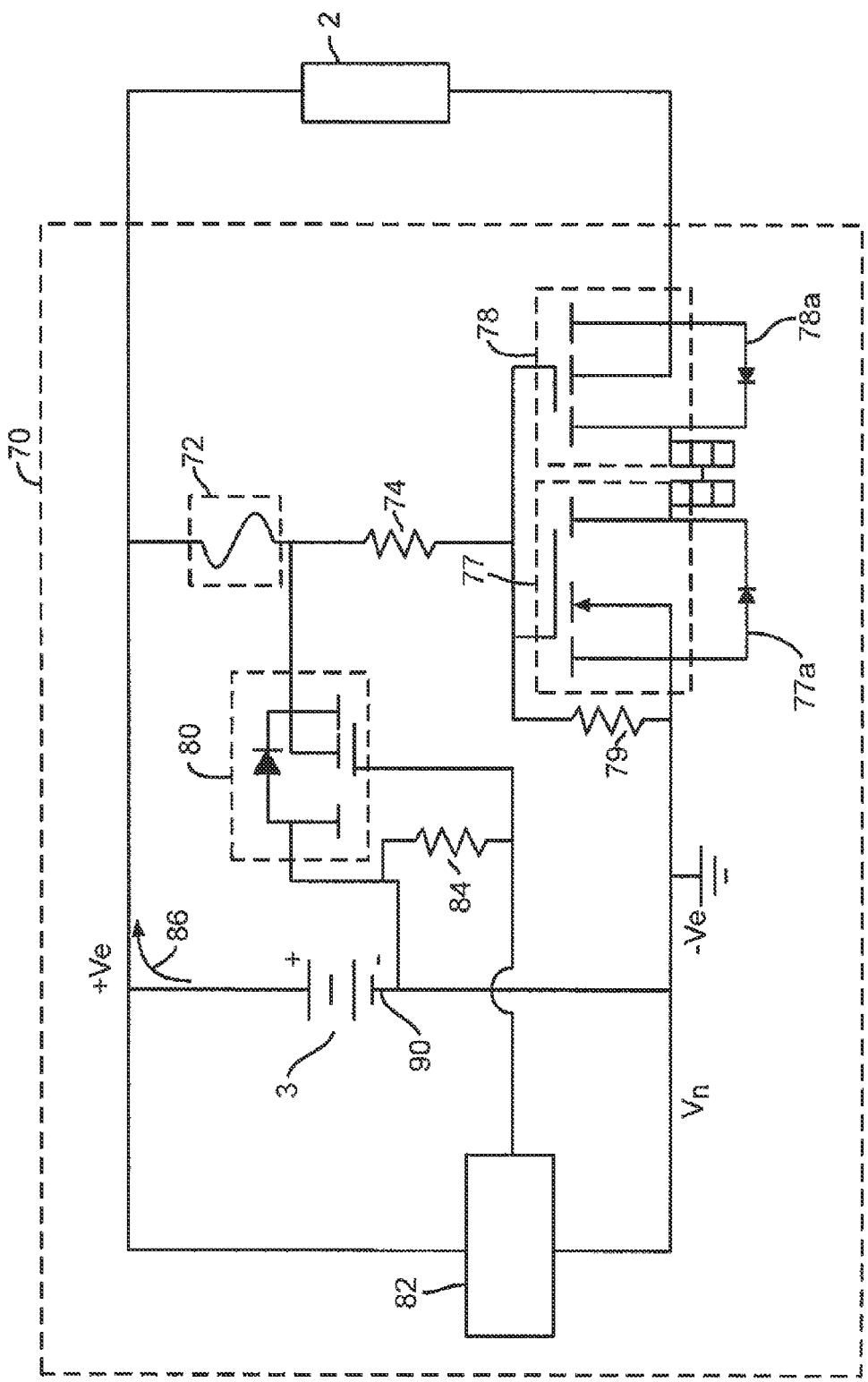
FIG. 3 illustrates the current invention's electrical schematic.

FIG. 3 is a schematic diagram of a battery pack (a rechargeable form is currently illustrated) 70 using a voltage activated $2^{nd}$ level safety circuit with a current activated fuse 72 to obtain, when necessary, permanent isolation. This voltage activated $2^{nd}$ level safety circuit 70 contains all the advantages of a voltage activated fuse circuit system, described above in the background of the invention, and provides greater flexibility in relation to current capabilities. In addition, permanent isolation is achieved through the current activated fuse 72 positioned not on the main power path of the upper and lower supply rails (+Ve, −Ve), and as a result, in combination with other components to be described below, a low current rated, activated fuse can be used. A low current rated, activated fuse includes and is not limited to a fuse that can receive current less than 1000 mA, preferably less than 500 mA; and most preferably less than 125 mA, and not open when the power cell 3 normally transmits current to the load 2 that is greater than the low rated fuse's current level. By using such a low current rated, activated fuse 72, even highly discharged cell packs 3 will (should) have enough current sourcing capabilities to ensure proper isolation of the pack 3.

As indicated above, the rechargeable battery pack 70 provides power to the load 2 between the upper and lower power supply rails, +Ve and −Ve. The rechargeable battery pack 70 has the power cell 3, the current activated fuse 72 extending from the upper power supply rail +Ve which means the current activated fuse is not on the main power path of the upper power supply rail +Ve, a fuse current limiter 74, a first isolation switch 77, an optional second isolation switch 78, an optional first diode 77a, an optional second diode 78a, an isolation pull down resistor 79, an activation switch 80, an activation monitoring system 82, and an activation pull down resistor 84.

The power cell 3 can be any conventional rechargeable battery system which includes and is not limited to a lithium ion type, a nickel-cadmium type, and a nickel-metal hydride type. The power cell 3, in the rechargeable battery pack 70, can also include one or more power cells. The phrase "a discharge control protocol" means the current originates at the power cell 3 and proceeds to the load 2 through the upper power supply rail +Ve. In contrast, the phrase "a charge control protocol" means the current originates at the load 2 and proceed to the power cell 3.

The fuse current limiter 74 is a resistor positioned between the fuse 72 and the first and second, optional, isolation switches 77, 78. The fuse current limiter 74 has a very large resistor value and as a result the fuse current limiter 74 limits the amount of current from the upper power supply rail +Ve into the current activated fuse 72. The amount of current that passes through the current activated fuse 72, as a result of the fuse current limiter 74, is well below the current activated fuse's maximum current rating which allows the current activated fuse 72 to remain closed even when the power cell's 3 current, which would normally open the current activated fuse 72, passes along the upper power supply rail +Ve to the load 2 until at least one unacceptable condition—an over voltage condition, an over current condition, a thermally unacceptable condition, or other unacceptable battery or circuit condition—is detected and acted upon. The predetermined threshold(s) will be discussed later in this disclosure. The current that passes through the current activated fuse 72, the fuse current limiter 74, and the first and second, optional, isolation switches 77, 78 is sufficiently below a voltage threshold to keep the current activated fuse 72 closed, and simultaneously sufficient to keep the first isolation switch 77 and the optional second isolation switch 78 closed.

The first and second isolation switches 77, 78 can be any variety of transistors. Preferably, each first and second isolation switch 77, 78 is a field effect transistor such as a MOSFET or a bipolar junction transistor. The first and second isolation switches 77, 78 illustrated in FIG. 3 are N-type MOSFETS. Each N-type MOSFET is configured in such a way that the gates are opened and closed based on the voltage that passes through the current activated fuse 72 and the fuse current limiter 74. The current that passes through the current activated fuse 72 and the fuse current limiter 74 is, as previously expressed and until at least one of the above-identified unacceptable conditions is detected, sufficient to keep the first and second isolation switches 77, 78 closed.

Each first and second isolation switch 77, 78, when a MOSFET design is used, is configured to have its respective drains (or source depending on the direction of the current) connected to isolate the rechargeable battery pack 70 from charging and discharging when the above-identified predetermined thresholds are met. The first and second isolation switches 77, 78 shall have a voltage threshold that is less than the minimum allowable power cell 3 voltage. Also, the first and second isolation switches 77, 78 shall have a current limit that is greater than the maximum current allowed by the rechargeable battery pack 70 since the first and second isolation switches 77, 78 are on the main power path—the lower power supply rail −Ve.

During normal working operation (a.k.a., conducting condition) and in particular during a battery charging mode, the first and second switches 77, 78 are closed after being activated. The first and second switches 77, 78 open, preferably only, after the current activated fuse 72 is blown. As previously discussed, the gates of first and second switches 77, 78, during battery supply mode, should receive sufficient current to maintain the first and second switches 77 and 78 in a closed position. Hence, the power cell's 3 current traverses from the power cell 3 along upper power supply rail, +Ve, to the load 2, with little current diverted into the current activated fuse 72, the fuse current limiter 74, and the first and second isolation switches 77, 78. Once the current passes through the load 2, the current proceeds along the lower power supply rail, −Ve, and through the first and second isolation switches 77, 78 (which includes the respective diodes 77a, 78a) to the power cell 3.

Current also flows through the negligible circuit loop, Vn, that can include the activation monitoring system 82, as illustrated in FIG. 3. The current that flows through the activation monitoring system 82 is negligible in comparison to the current in the loop that includes the power cells 3, the load 2, the first isolation switch 77 and the second isolation switch 78. The activation monitoring system 82 monitors the rechargeable battery pack 70 for an over voltage condition, an over current condition, a thermally unacceptable condition, or some other unacceptable battery or circuit condition, for example and not limited to a predetermined number of charging/re-charging cycles the battery pack 70 experiences. When the activation monitoring system 82 detects the rechargeable battery pack 70 has an over voltage condition, an over current condition, a thermally unacceptable condition, or some other unacceptable battery or circuit condition, the activation monitoring system 82 generates a closing current. The closing current is transmitted from the activation monitoring system 82 to the activation switch 80.

Figure 4:
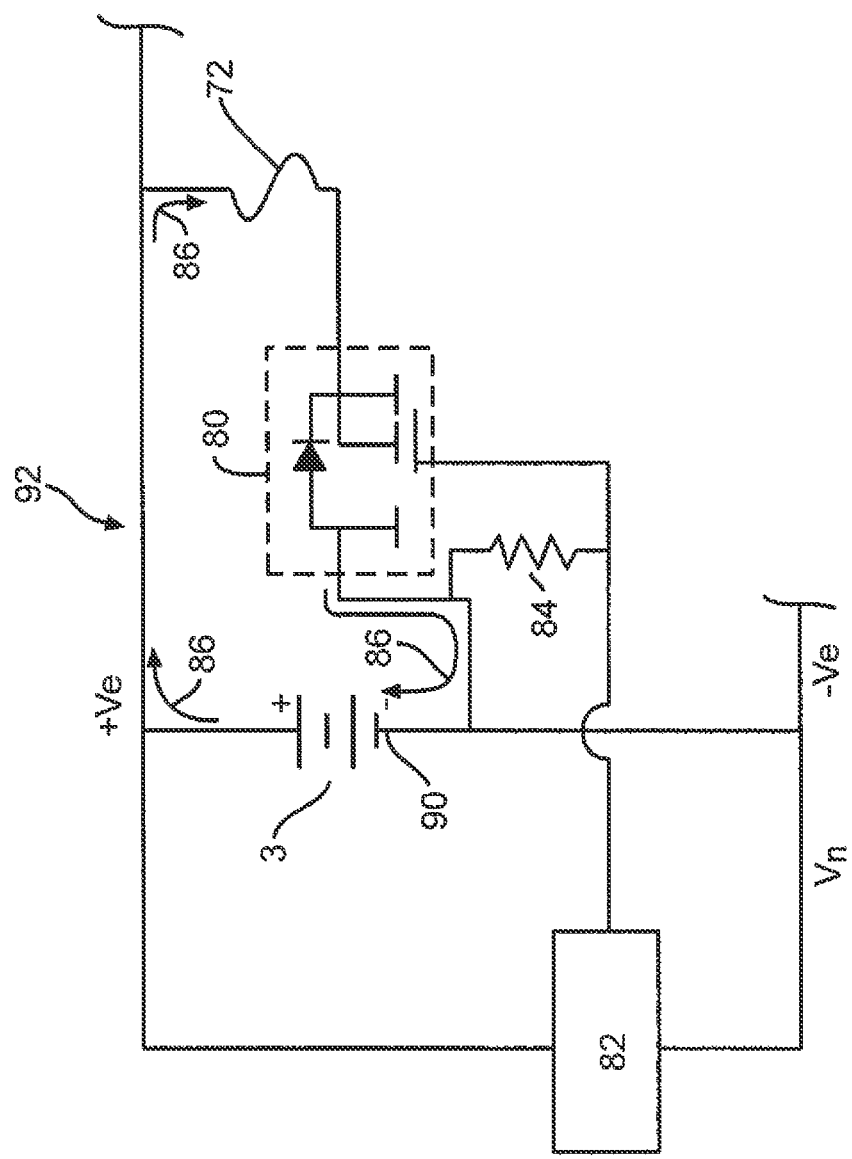
FIG. 4 illustrates an enlarged and isolated view of the blowing fuse circuit loop of FIG. 3.

The activation switch 80 can be any variety of transistors. Preferably, the activation switch 80 is a field effect transistor such as a MOSFET or a bipolar junction transistor. The activation switch 80 illustrated in FIGS. 3 and 4 is an N-type MOSFET. The activation switch's gate receives the closing current. Upon receipt of the closing current, the activation switch 80 is closed.

Figure 6:
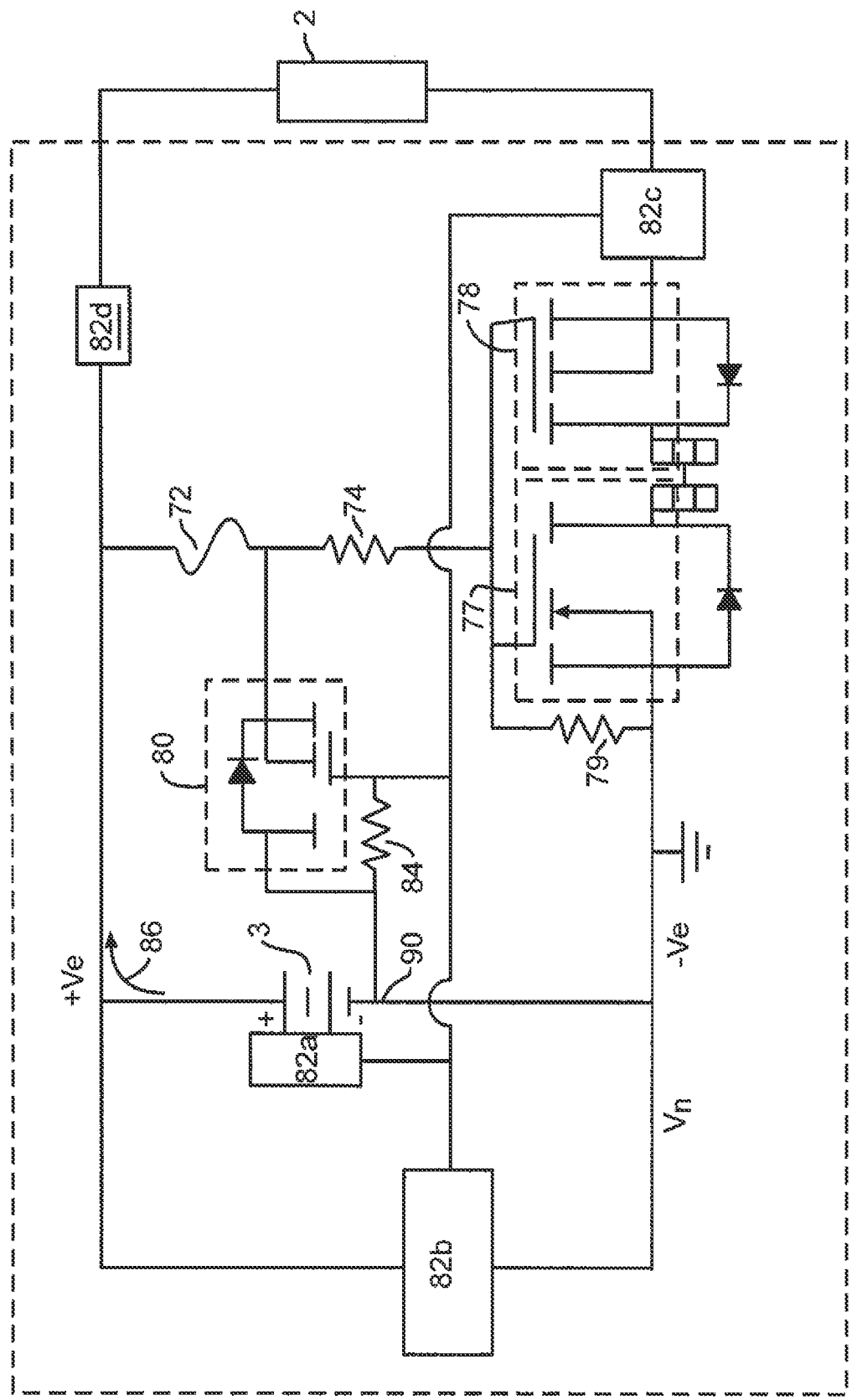
FIGS. 6 to 8 illustrate alternative embodiments of FIG. 3.

The activation switch 80 and its location are important. The activation switch's 80 drain and source interconnect, respectively, to (a) (i) the electrical circuitry positioned between the current activated fuse 72 and the fuse current limiter 74, as illustrated in FIGS. 3 and 4, or (ii) alternatively, directly to the current activated fuse 72, as illustrated in FIG. 6; and (b) (i) the electrical circuitry between the power cell's most negative node 90 and the first and second isolation switches 77, 78, as illustrated in FIGS. 3 and 4; or (ii) alternatively directly to the power cell's most negative mode 90, as illustrated in FIG. 6. When the activation switch 80 is closed, a blowing fuse circuit loop 92 becomes active that has no fuse current limiter 74 or other resistors that would impede the power cell's current from traversing from the power cell 3 through the current activated fuse 72 and to the most negative cell node 90 of the power cell 3. That blowing fuse circuit loop 92, as enlarged and illustrated in FIG. 4, causes the current activated fuse 72, which has a low current rating and no resistors to impede the power cell's current, to expeditiously blow the current activated fuse 72 open.

Figure 5:
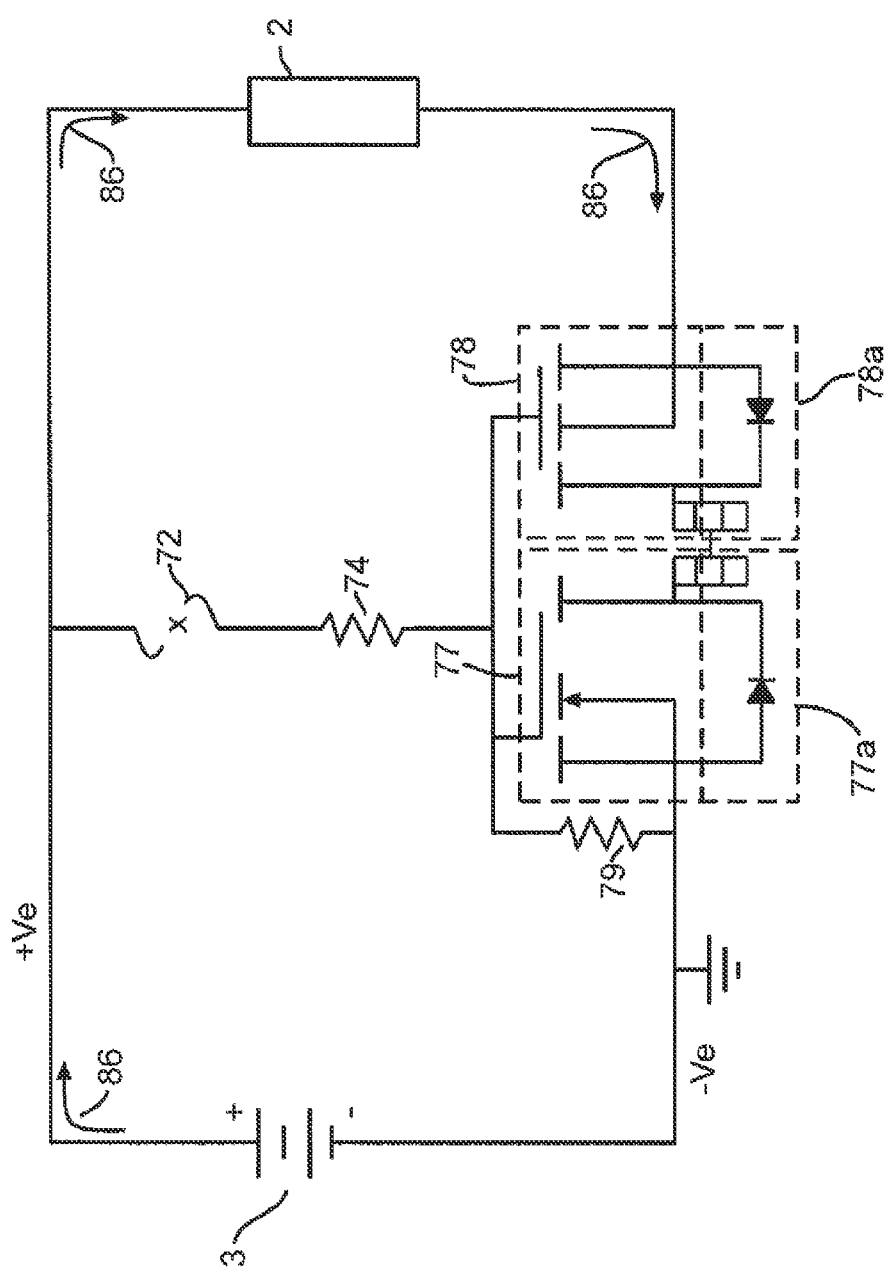
FIG. 5 illustrates an enlarged and isolated view of certain components of FIG. 3.

Once the current activated fuse 72 is open, as illustrated in FIG. 5 by the letter "x", the gates of the first and second switches 77, 78 are no longer pulled high, and the isolation pull down resistor 79—positioned between the gates of the first and second switches 77, 78 and the lower power supply rail, −Ve,—forces, as a result of the current activated fuse 72 being open, the first and second switches 77, 78 to expeditiously open. Since the first and second switches 77, 78 are in the lower power supply rail, −Ve, no current is allowed to flow and, thus, full and permanent isolation is achieved.

The activation pull down resistor 84 interconnects (a) the electrical path between the gate of the activation switch 80 and the activation monitoring system 82, and (b) the electrical path between the power cell's most negative node 90 and the activation switch 80. The activation pull down resistor has a large resistance value that allows the activation switch 80 (i) to remain in an open state until at least one of the above-identified predetermined thresholds is met and (ii) not to float to unpredictable levels.

The activation monitoring system 82 may comprise a conventional protection circuit module (PCM), a microcontroller unit (MCU), and/or a secondary over-voltage protection device. The PCM may include an integrated circuit control chip operatively coupled to the first and second, optional, electronic switching devices 77, 78.

The PCM monitors abnormal currents or voltages, and may monitor, if the voltage level of any one of the cells 3 is greater than an over voltage or over current threshold level, for a time interval less than or equal to a transient time interval. As used herein, a "transient time interval" is the time interval it takes for a permanent protection mechanism, e.g., a fuse in one instance, of an associated battery pack to be activated in case of a sustained over voltage condition. The transient time interval may vary based on the particular cell chemistry, the particular permanent protection mechanism, and other considerations. In one embodiment, the transient time interval may be about 10 microseconds (μs) or shorter (but greater than zero), and in some instances longer than 10 μs depending on the application and components being used. As such, the activation monitoring system 82 may protect the cells 3 from shorter over voltage spikes that would otherwise not activate any other more permanent protection mechanisms. For example, the activation monitoring system 82 may protect the cells 3 from a short over voltage spike having a magnitude of only 1 millivolt (mV) and a duration of only 1 μs.

The activation monitoring system 82 may also monitor other abnormal currents or voltages that include sustained over voltage or over current conditions for time intervals greater than the transient time interval. With this capability, the activation monitoring system 82 may provide, in part, a duplicative function of the "transient time interval" protection.

The activation monitoring system 82 may also comprise a thermal protector that shuts the rechargeable battery pack 70 when any component thereof exceeds a predetermined temperature. The thermal protector may be, for example, a thermal fuse, a thermal breaker or a positive temperature coefficient (PTC) thermistor. Thermal protector may also be either non-resettable or resettable. Non-resettable thermal protectors have lower equivalent series resistance (ESR), but once tripped, a rechargeable battery pack employing the non-resettable thermal protector is essentially no longer of any use. Resettable thermal protectors have higher ESRs, but can be tripped and reset many times.

In other words, when the activation monitoring system 82 detects an over current condition, an over voltage condition, a thermal degradation condition or some other unacceptable battery or circuit condition, the activation monitoring system 82 transmits the closing current to the activation switch's 80 gate. That closing current closes the activation switch 80 which activates the blowing fuse circuit loop (a.k.a., a fuse opening current circuit) 92, as enlarged and illustrated in FIG. 4. Once the fuse opening current circuit 92 is capable of receiving the current 86 from the cell 3, the current 86 opens the current activated fuse 72. Opening the current activated fuse 72 also causes the first and second, optional, switches 77, 78 to open. Once the current activated fuse 72 and the first and second, optional, switches 77, 78 are open, then full and permanent isolation of the cell 3 from the load 2 is achieved.

Figure 7:
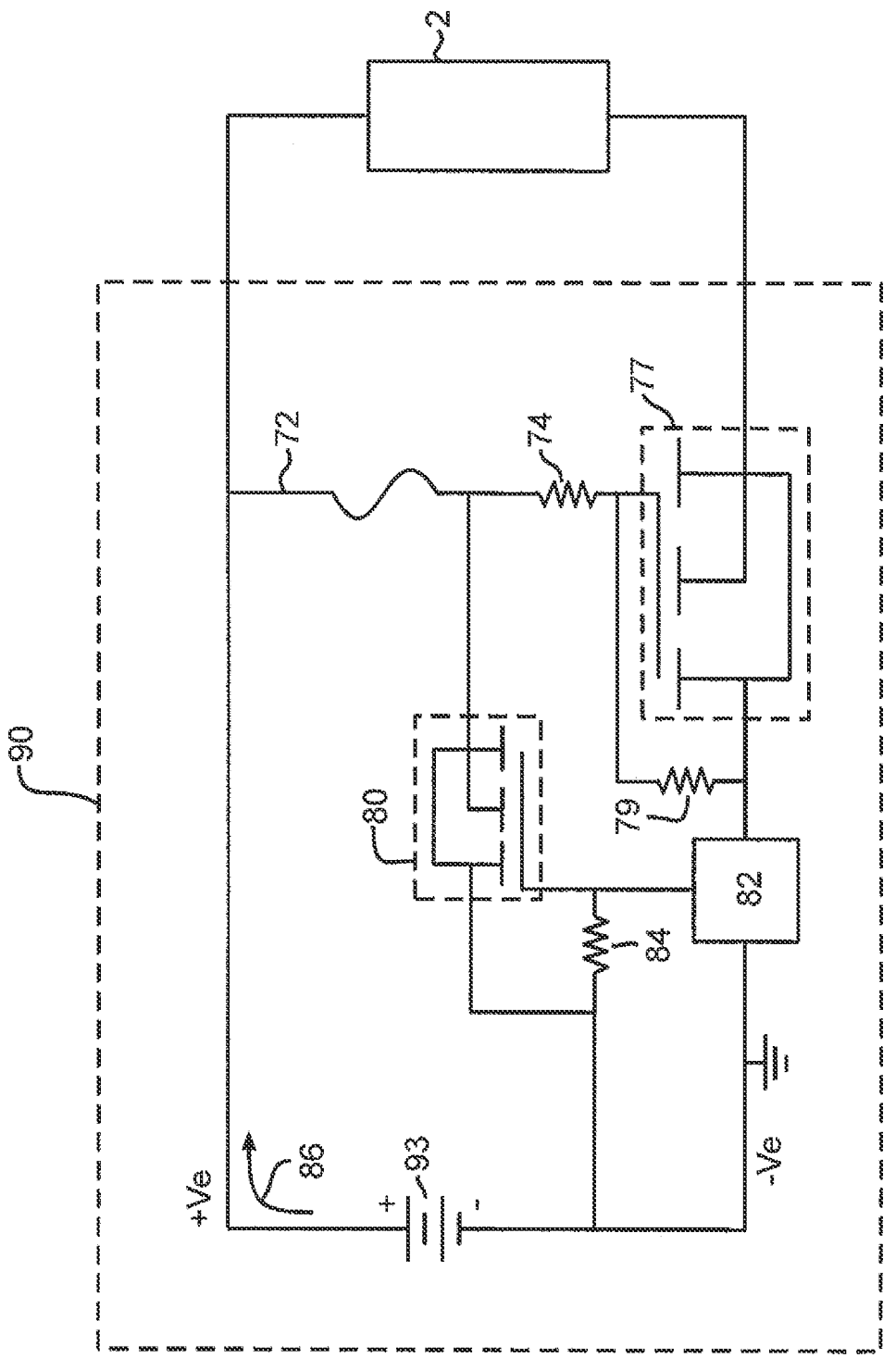

If so desired, the activation monitoring system 82, that detects an over current condition, an over voltage condition, a thermal degradation condition or some other unacceptable battery or circuit condition, can be in (a) a single component, as illustrated in FIGS. 3 and 4, on the negligible power line Vn, on the lower power line −Ve, as illustrated in FIG. 7, or, alternatively, on the higher power line +Ve; or (b) various individual components (82a, 82b, 82c, 82d as represented and illustrated in FIG. 6) on the negligible power line Vn, the lower power line −Ve, on or near the battery 3, the upper power line +Ve. It is understood that each component 82, 82a, 82b, 82c can contain one or more of the above-identified threshold detection systems. Moreover, each component 82, 82a, 82b, 82c, 82d can be spaced throughout the rechargeable battery pack 70 to properly detect any over current condition, over voltage condition, thermal degradation condition, or some other unacceptable battery or circuit condition, for specific components or locations along the power circuit. The only condition is that each component must transmit the closing current to the gate of the activation switch 80 when those threshold conditions are detected in the rechargeable battery pack 70.

An alternative embodiment, as illustrated in FIG. 7, has a battery pack 90 using a non-rechargeable battery 93—a.k.a., a primary battery, such a lithium/silver vanadium oxide system—that directs its current 86 to the load 2 and through the first switch 77 and back to the cell 93. This embodiment does not include the optional second switch 78 but the second switch 78, which is preferred to be in a parallel configuration with the first switch 77, and additional other parallel switches can be used if desired. The remaining components are the same as described and illustrated above.

Figure 8:
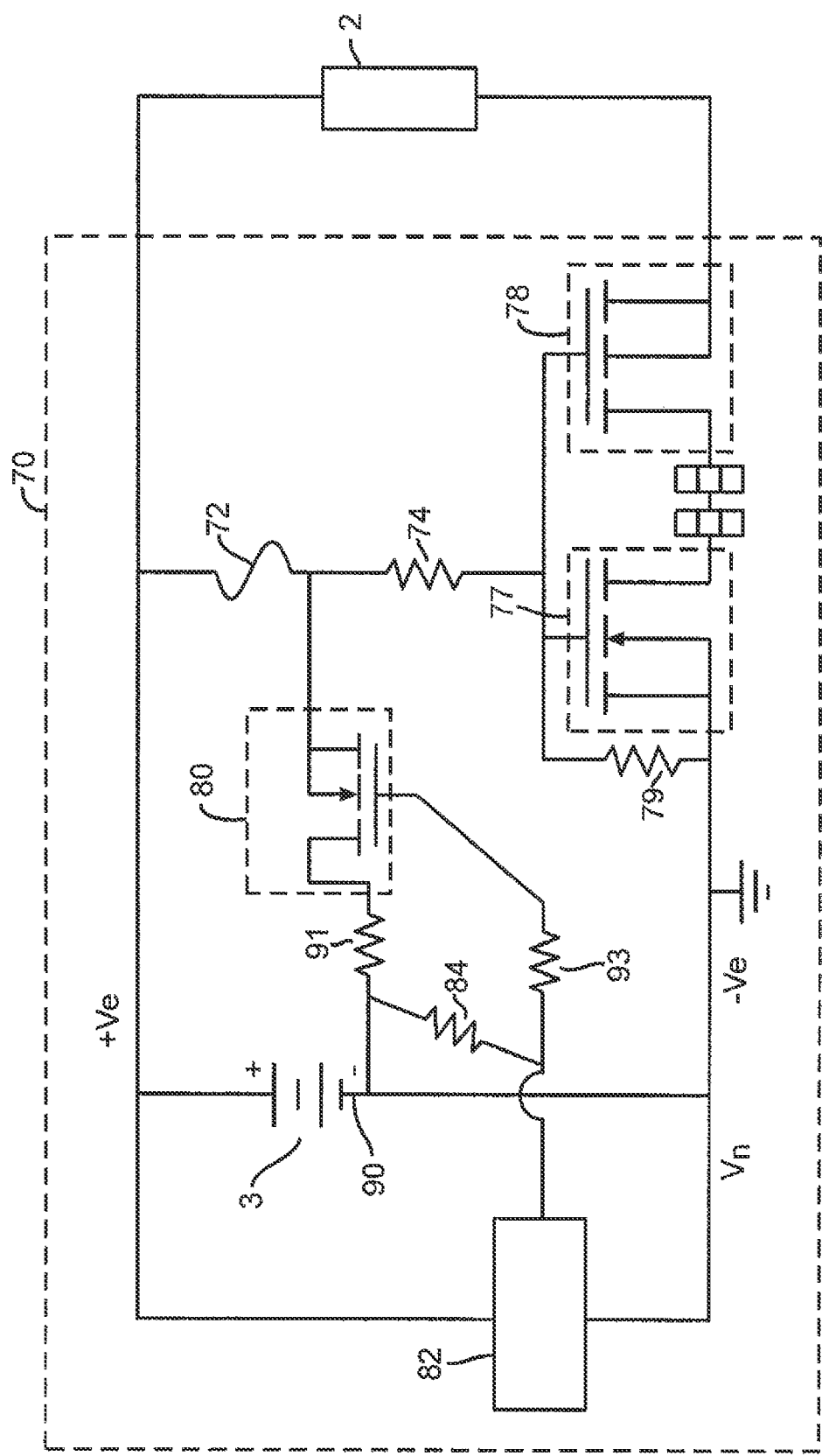

Another alternative embodiment is illustrated in FIG. 8. FIGS. 3 and 8 are essentially identical except for a few differences. A first difference is the addition of an activation resistor 91 positioned between the activation switch 80 and the most negative cell node 90 of the power cell 3. The activation resistor 91 is positioned to ensure an accurate and repeatable fuse blow. The value of the activation resistor 91 is a predetermined resistance value determined by the circuit manufacturer, and in a medical application that predetermined resistance can range from 0.1 to 50 ohms.

A second difference is the addition of an activation signal current limiting resistor 93 positioned between the activation switch 80 and the activation monitoring system 82. The activation signal current limiting resistor 93 has a large resistor value and serves to limit the closing current's current to the gate of the activation switch 80.

A third difference is the removal of the optional diodes in each FET—first and second isolation switches 77 (also illustrated at FIG. 7), 78 and the activation switch 80.

In addition to having the first isolation switch 77, and the optional second isolation switch 78, the battery pack 70 can also have an additional isolation switch(es). The additional isolation switch(es) in parallel can allow the battery pack 70 to use higher currents. As such, the number of isolation switches is dependent on the current used in the battery pack 70.

Figure 9:
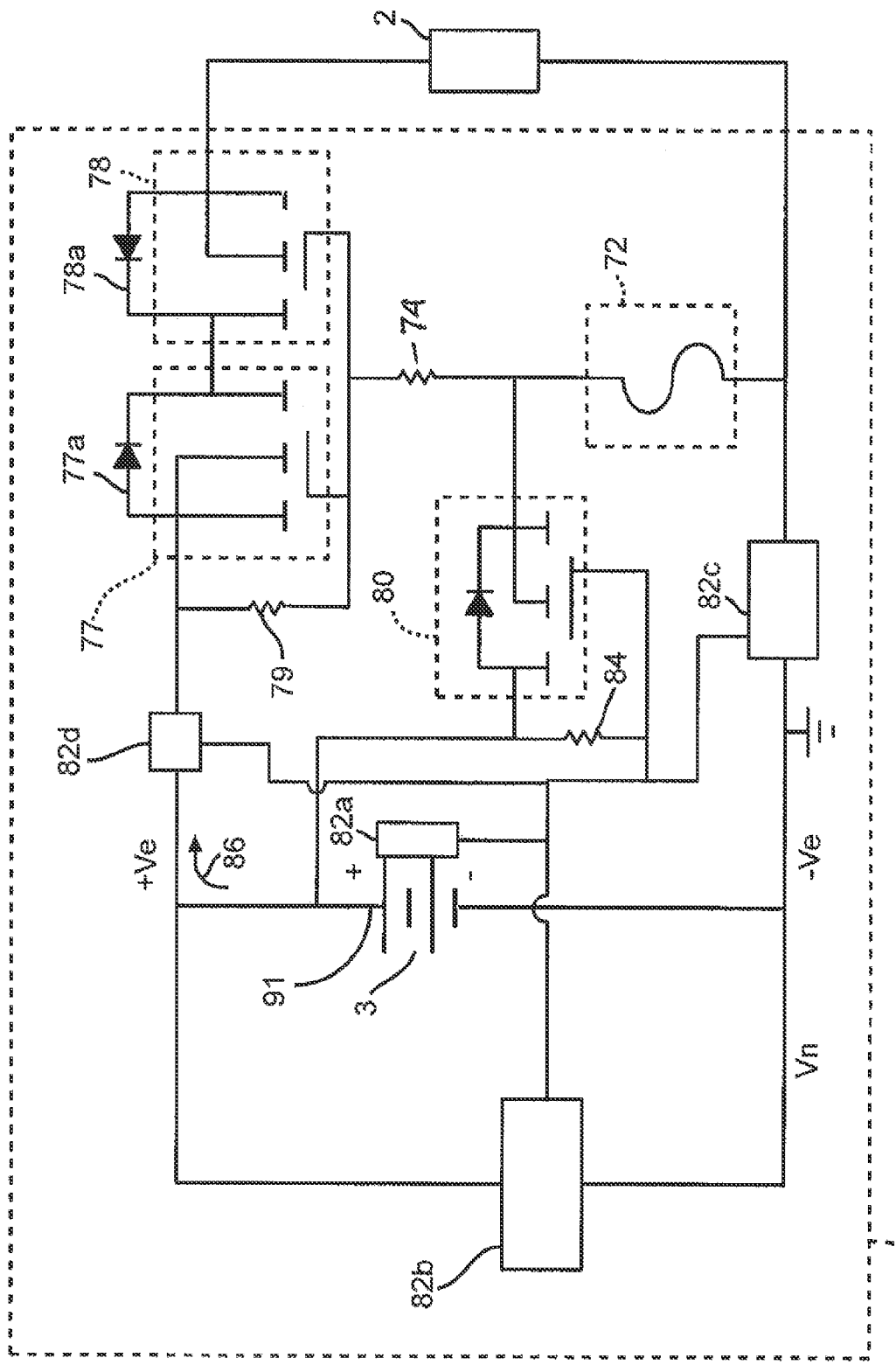
FIG. 9 illustrates an alternative embodiment of the present invention utilizing different field effect transistors along an upper supply rail.

FIG. 9 illustrates an alternative schematic diagram of the battery pack (a rechargeable form is currently illustrated) 70 using a voltage activated $2^{nd}$ level safety circuit with a current activated fuse 72 to obtain, when necessary, permanent isolation. This alternative schematic diagram of the battery pack 70 is basically the inverse of the above-identified schematics. Instead of the current activated fuse 72 pulling the first and, the optional, second isolation switches 77, 78, which are n-FETS, up as described above and illustrated at FIGS. 3 to 8, the current activated fuse 72 pulls the first and, the optional, second isolation switches 77, 78, which are p-fets as illustrated in FIG. 9, down. As a result the current activated fuse 72 is blown by shorting the isolation pull up resistor 79a. When the fuse 72 is blown, the first and, the optional, second isolation switches 77, 78 open which leads to isolation. For the most part, the components of FIGS. 3 to 8 and FIG. 9 are the same and operate in the same manner except for a few differences. Including the above-identified differences, other differences between the circuits illustrated at FIG. 9 and FIGS. 3 to 8 are:

(a) FIG. 9 has its first and optional second isolation switches 77, 78 as p-type field effect transistors, like p-type MOSFETS, or equivalents thereof positioned along the upper supply rail +Ve; while FIGS. 3 to 8 has its first and optional second isolation switches 77, 78 as n-type MOSFETS positioned along the lower supply rail −Ve;

(b) FIG. 9 has its current activated fuse 72 extending from the lower power supply rail −Ve; while FIGS. 3 to 8 has its current activated fuse 72 extending from the upper power supply rail +Ve—which means the current activated fuse, as illustrated at FIGS. 3 to 9, is not on the main power path of the upper or lower power supply rails, +Ve, −Ve; and (c) FIG. 9 has its activation switch's 80 source and drain interconnect to (a) (i) the electrical circuitry positioned between the current activated fuse 72 and the fuse current limiter 74 or (ii) alternatively, directly to the current activated fuse 72 (as shown possible in FIG. 6); and (b) (i) the electrical circuitry between the power cell's most positive node 91 and the first and second isolation switches 77, 78, or (ii) alternatively directly to the power cell's most positive mode 91; while FIGS. 3 to 8 illustrate a similar configuration as described above and illustrated in FIGS. 3 to 8.

The fuse and resistor values set forth in this application can change depending on the desired voltage or current that is desired to pass through the system. Conceptually, the fuse and resistor values should maintain values that correspond with the teachings of the present invention.

It is understood this voltage activated second level safety circuit for permanent isolation can replace corresponding safety circuitry using a voltage activated fuse. In addition, this voltage activated second level safety circuit for permanent isolation can be implemented in military or class III medical devices that could use this voltage activated second level safety circuit for permanent isolation. The U.S. Food and Drug Administration identifies which medical devices are class III medical devices. Examples, and limited to, of class III medical devices that could use the claimed invention are pace makers, neurostimulators, neuromodulators, heart pumps, defibrillators or any other medical product that should have a voltage activated second level safety circuit for permanent isolation that is identified by the U.S. Food and Drug Administration as a Class III medical device. Generically, this voltage activated second level safety circuit for permanent isolation can be installed, respectively, in an implantable medical device, a military device, a personal digital assistant, a cell phone, a laptop computer, and a power tool.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

We claim:

1. A battery pack, comprising:
   a power cell;
   a higher supply rail and a lower power supply rail electrically interconnecting the power cell and a load;
   a first electronic switching device positioned, between the load and the power cell, on the lower power supply rail, wherein current passing through the lower power supply rail passes through the first electronic switching device's source and drain when the first electronic switching device is in a conducting condition;
   a current activated fuse having a current rated fuse below the power cell's current and operatively coupled to (a) the power cell through an extension from one of the power supply rails, and (b) a fuse current limiter's proximal end;
   the fuse current limiter's distal end operatively connects to the first electronic switching device's gate, the fuse current limiter limits the amount of the power cell's current that enters the current activated fuse and allows sufficient current from the power cell to pass to the first electronic switching device's gate in a conducting condition;
   an activation monitoring system that (a) monitors the battery pack for any over current condition, over voltage condition, thermally unacceptable condition, unacceptable battery or circuitry condition, or combinations thereof, and (b) transmits a closing current to a gate of an activation switch when the activation monitoring system detects the battery pack has an over current condition, an over voltage condition, a thermally unacceptable condition, an unacceptable battery or circuitry condition, or combinations thereof;

the activation switch operatively connects to (a) the current activated fuse or the fuse circuitry positioned between the current activated fuse and the fuse current limiter, and (b) the power cell's most negative node or the lower power supply rail between the first electronic switching device and the power cell;

the activation switch closes upon receipt of the closing current and activates a fuse opening current circuit wherein the power cell transmits current through the current activated fuse so the current activated fuse opens;

in response to the current activated fuse opening, the first electronic switching device opens.

2. The battery pack of claim 1 wherein the current flows from the power cell to the load during a discharge control protocol.

3. The battery pack of claim 2 wherein the load is selected from the group consisting of an implantable medical device, a military device, a personal digital assistant, a cell phone, a laptop computer, and a power tool.

4. The battery pack of claim 1, further comprising an activation pull down resistor that operatively connects to (a) the activation circuitry between the activation switch and the power cell and (b) monitoring circuitry between the activation monitoring system and the activation switch.

5. The battery pack of claim 1, further comprising a second electronic switching device operatively connected to the power cell through the lower power supply rail and positioned between the load and the first electronic switching device.

6. The battery pack of claim 1 wherein the power cell is a rechargeable battery.

7. The battery pack of claim 1 wherein the first electronic switching device is a field effect transistor.

8. The battery pack of claim 5 wherein the second electronic switching device is a field effect transistor.

9. The battery pack of claim 1 wherein the activation switch is a field effect transistor.

10. The battery pack of claim 1 wherein the current activated fuse's current rated fuse is less than 1000 mA.

11. The battery pack of claim 1 wherein the activation monitoring system monitors the battery pack for any over current condition, over voltage condition, thermally unacceptable condition, an unacceptable battery or circuitry condition, or combinations thereof on the higher power supply rail, the lower power supply rail, a negligible supply rail, or combinations thereof.

12. The battery pack of claim 1 further comprising an activation resistor positioned between (i) the activation switch and (ii) the power cell or the electrical circuitry between the first electronic switching device and the power cell.

13. The battery pack of claim 1 further comprising an activation signal current limiting resistor positioned between (i) the activation switch and (ii) the activation monitoring system.

14. The battery pack of claim 1 further comprising an activation pull down resistor between (i) the electrical circuitry connecting the activation switch and the activation monitoring system and (ii) the electrical circuitry connecting the activation switch and the power cell or the electrical circuitry between the first electronic switching device and the power cell.

15. The battery pack of claim 1 wherein the current activated fuse is operatively coupled to the power cell through an extension from the higher power supply rail.

16. A battery pack, comprising:
a rechargeable power cell;
a higher and lower power supply rail;
a first field effect transistor operatively coupled to the power cell on the lower power supply rail, wherein current passing through the power cell also passes through the first field effect transistor's source and drain when the first field effect transistor is in a conducting condition;
a current activated fuse having a current rated fuse below the power cell's current and operatively coupled to (a) the power cell through an extension from the higher power supply rail, and (b) a fuse current limiter's proximal end;
the fuse current limiter's distal end operatively connects to the first field effect transistor's gate, the fuse current limiter limits the amount of the power cell's current that enters the current activated fuse and allows sufficient current from the power cell to pass to the first field effect transistor's gate in a conducting condition;
an activation monitoring system that (a) monitors the battery pack for any over current condition, over voltage condition, thermally unacceptable condition, unacceptable battery or circuitry conditions, or combinations thereof, and (b) transmits a closing current to an activation field effect transistor's gate when the activation monitoring system detects the battery pack has an over current condition, an over voltage condition, a thermally unacceptable condition, an unacceptable battery or circuitry condition, or combinations thereof;
the activation field effect transistor operatively connects to (a) the current activated fuse or the fuse circuitry positioned between the current activated fuse and the fuse current limiter, and (b) the power cell's most negative node or the electrical circuitry between the first field effect transistor and the power cell;
an activation resistor operatively connects to (i) the activation field effect transistor and (ii) the power cell or the lower power supply rail between the first field effect transistor and the power cell;
an activation signal current limiting resistor operatively connects to (i) the activation field effect transistor and (ii) the activation monitoring system;
an activation pull down resistor that operatively connects to (a) the activation circuitry between the activation switch and the power cell and (b) monitoring circuitry between the activation monitoring system and the activation switch;
the activation field effect transistor closes upon receipt of the closing circuit and opens a second electrical circuit wherein the power cell transmits current through the current activated fuse so the current activated fuse opens;
in response to the current activated fuse opening, the first field effect transistor opens.

17. The battery pack of claim 16 wherein the current flows from the power cell to a load during a discharge control protocol.

18. The battery pack of claim 17 wherein the load is selected from the group consisting of an implantable medical device, a military device, a personal digital assistant, a cell phone, a laptop computer, and a power tool.

19. The battery pack of claim 16, further comprising a second field effect transistor operatively connected to the power cell through the lower power supply rail and positioned between a load and the first field effect transistor.

20. The battery pack of claim 16 wherein the activation monitoring system monitors the battery pack for any over current condition, over voltage condition, thermally unacceptable condition, unacceptable battery or circuit condition, or combinations thereof on the higher power supply rail, the lower power supply rail, a negligible supply rail, or combinations thereof.

21. A battery pack, comprising:
a power cell;
a higher supply rail and a lower power supply rail electrically interconnecting the power cell and a load;
a first electronic switching device positioned, between the load and the power cell, on the higher power supply rail, wherein current passing through the higher power supply rail passes through the first electronic switching device's source and drain when the first electronic switching device is in a conducting condition;
a current activated fuse having a current rated fuse below the power cell's current and operatively coupled to (a) the power cell through an extension from the lower power supply rail, and (b) a fuse current limiter's proximal end;
the fuse current limiter's distal end operatively connects to the first electronic switching device's gate, the fuse current limiter limits the amount of the power cell's current that enters the current activated fuse and allows sufficient current from the power cell to pass to the first electronic switching device's gate in a conducting condition;
an activation monitoring system that (a) monitors the battery pack for any over current condition, over voltage condition, thermally unacceptable condition, unacceptable battery or circuitry condition, or combinations thereof, and (b) transmits a closing current to a gate of an activation switch when the activation monitoring system detects the battery pack has an over current condition, an over voltage condition, a thermally unacceptable condition, an unacceptable battery or circuitry condition, or combinations thereof;
the activation switch operatively connects to (a) the current activated fuse or the fuse circuitry positioned between the current activated fuse and the fuse current limiter, and (b) the power cell's most positive node or the upper power supply rail between the first electronic switching device and the power cell;
the activation switch closes upon receipt of the closing current and activates a fuse opening current circuit wherein the power cell transmits current through the current activated fuse so the current activated fuse opens;
in response to the current activated fuse opening, the first electronic switching device opens.

22. The battery pack of claim 21 wherein the current flows from the power cell to a load during a discharge control protocol.

23. The battery pack of claim 22 wherein the load is selected from the group consisting of an implantable medical device, a military device, a personal digital assistant, a cell phone, a laptop computer, and a power tool.

24. The battery pack of claim 21, further comprising a second electronic switching device operatively connected to the power cell through the higher power supply rail and positioned between the load and the first electronic switching device.

25. The battery pack of claim 21 wherein the activation monitoring system monitors the battery pack for any over current condition, over voltage condition, thermally unacceptable condition, unacceptable battery or circuit condition, or combinations thereof on the higher power supply rail, the lower power supply rail, a negligible supply rail, or combinations thereof.

26. A battery pack, comprising:
a power cell;
a higher supply rail and a lower power supply rail electrically interconnecting the power cell and a load;
a first electronic switching device positioned, between the load and the power cell, on the higher power supply rail, wherein current passing through the higher power supply rail passes through the first electronic switching device's source and drain when the first electronic switching device is in a conducting condition;
a current activated fuse having a current rated fuse below the power cell's current and operatively coupled to (a) the power cell through an extension from one of the power supply rails, and (b) a fuse current limiter's proximal end;
the fuse current limiter's distal end operatively connects to the first electronic switching device's gate;
an activation monitoring system that (a) monitors the battery pack for any over current condition, over voltage condition, thermally unacceptable condition, unacceptable battery or circuitry condition, or combinations thereof, and (b) transmits a closing current to a gate of an activation switch when the activation monitoring system detects the battery pack has an over current condition, an over voltage condition, a thermally unacceptable condition, an unacceptable battery or circuitry condition, or combinations thereof;
the activation switch operatively connects to (a) the current activated fuse or the fuse circuitry positioned between the current activated fuse and the fuse current limiter, and (b) the power cell's most negative node or the lower power supply rail;
the activation switch closes upon receipt of the closing current and activates a fuse opening current circuit wherein the power cell transmits current through the current activated fuse so the current activated fuse opens;
in response to the current activated fuse opening, the first electronic switching device opens.

27. The battery pack of claim 26 wherein the current flows from the power cell to a load during a discharge control protocol.

28. The battery pack of claim 27 wherein the load is selected from the group consisting of an implantable medical device, a military device, a personal digital assistant, a cell phone, a laptop computer, and a power tool.

29. The battery pack of claim 26, further comprising a second electronic switching device operatively connected to the power cell through the higher power supply rail and positioned between the load and the first electronic switching device.

30. The battery pack of claim 26 wherein the activation monitoring system monitors the battery pack for any over current condition, over voltage condition, thermally unacceptable condition, unacceptable battery or circuit condition, or combinations thereof on the higher power supply rail, the lower power supply rail, a negligible supply rail, or combinations thereof.

31. The battery pack of claim 26 wherein the first electronic switching device is a field effect transistor.

32. A battery pack, comprising:
a power cell;
a higher supply rail and a lower power supply rail electrically interconnecting the power cell and a load;
a first electronic switching device positioned, between the load and the power cell, on the higher power supply rail, wherein current passing through the higher power supply rail passes through the first electronic switching device's source and drain when the first electronic switching device is in a conducting condition;
a current activated fuse having a current rated fuse below the power cell's current and operatively coupled to (a) the power cell through an extension from the higher power supply rail, and (b) a fuse current limiter's proximal end;
the fuse current limiter's distal end operatively connects to the first electronic switching device's gate;
an activation monitoring system that (a) monitors the battery pack for any over current condition, over voltage condition, thermally unacceptable condition, unacceptable battery or circuitry condition, or combinations thereof, and (b) transmits a closing current to a gate of an activation switch when the activation monitoring system detects the battery pack has an over current condition, an over voltage condition, a thermally unacceptable condition, an unacceptable battery or circuitry condition, or combinations thereof;
the activation switch operatively connects to (a) the current activated fuse or the fuse circuitry positioned between the current activated fuse and the fuse current limiter, and (b) the power cell's most negative node or the lower power supply rail;
the activation switch closes upon receipt of the closing current and activates a fuse opening current circuit wherein the power cell transmits current through the current activated fuse so the current activated fuse opens;
in response to the current activated fuse opening, the first electronic switching device opens.

33. The battery pack of claim 32 wherein the current flows from the power cell to a load during a discharge control protocol.

34. The battery pack of claim 33 wherein the load is selected from the group consisting of an implantable medical device, a military device, a personal digital assistant, a cell phone, a laptop computer, and a power tool.

35. The battery pack of claim 32, further comprising a second electronic switching device operatively connected to the power cell through the higher power supply rail and positioned between the load and the first electronic switching device.

36. The battery pack of claim 32 wherein the activation monitoring system monitors the battery pack for any over current condition, over voltage condition, thermally unacceptable condition, unacceptable battery or circuit condition, or combinations thereof on the higher power supply rail, the lower power supply rail, a negligible supply rail, or combinations thereof.

37. The battery pack of claim 32 wherein the first electronic switching device is a field effect transistor.

* * * * *